United States Patent
Stroiescu et al.

(10) Patent No.: US 10,802,103 B2
(45) Date of Patent: Oct. 13, 2020

(54) SYSTEM FOR ENHANCED INDOOR AND OUTDOOR POSITION MEASUREMENT

(71) Applicant: Statsports Group Limited, Newry (GB)

(72) Inventors: Florin Stroiescu, Dublin (IE); Alan Clarke, Bessbrook (GB); Sean O'Connor, Bellurgan (IE); Valeriu Emanuel Ionita, Drogheda (IE)

(73) Assignee: STATSPORTS GROUP LIMITED, Newry (GB)

( * ) Notice: Subject to any disclaimer, the term of this patent is extended or adjusted under 35 U.S.C. 154(b) by 154 days.

(21) Appl. No.: 16/092,669

(22) PCT Filed: Mar. 30, 2017

(86) PCT No.: PCT/GB2017/000047
§ 371 (c)(1),
(2) Date: Oct. 10, 2018

(87) PCT Pub. No.: WO2017/178778
PCT Pub. Date: Oct. 19, 2017

(65) Prior Publication Data
US 2019/0128995 A1    May 2, 2019

(30) Foreign Application Priority Data

Apr. 11, 2016 (GB) .................... 1606165.7

(51) Int. Cl.
*G01S 5/02* (2010.01)
*G01S 5/14* (2006.01)
(Continued)

(52) U.S. Cl.
CPC ............ *G01S 5/0273* (2013.01); *G01S 1/042* (2013.01); *G01S 1/08* (2013.01); *G01S 5/0226* (2013.01);
(Continued)

(58) Field of Classification Search
CPC .......... G01S 1/042; G01S 1/08; G01S 5/0226; G01S 5/0268; G01S 5/0273; G01S 5/12; G01S 5/14; G01S 13/878
See application file for complete search history.

(56) References Cited

U.S. PATENT DOCUMENTS

| 4,636,795 A | 1/1987 | Dano |
| 2011/0171970 A1 | 7/2011 | Ishikawa |
| 2012/0086607 A1 | 4/2012 | Ameti et al. |

FOREIGN PATENT DOCUMENTS

| EP | 2703832 A2 | 3/2014 |
| WO | 2012142688 A1 | 10/2012 |

OTHER PUBLICATIONS

International Search Report for PCT/GB2017/000047 dated Jul. 21, 2017, 5 Pages.
(Continued)

*Primary Examiner* — Dao L Phan
(74) *Attorney, Agent, or Firm* — Faegre Drinker Biddle & Reath LLP

(57) ABSTRACT

A system and method for measuring the position of one or more object in an area of interest. The system has a primary beacon located at a first fixed position in or near the area of interest which generates a time referenced primary signal, two or more secondary beacons located at different fixed positions in or near the area of interest which generate time referenced secondary signals and one or more portable tag, the portable tag being attachable to the object. The portable tag has a portable tag circuit for calculating the distance of the portable tag to the primary and secondary beacons by a time of flight calculation which uses, the known position of the primary and secondary beacons, time referenced signals and delay information associated with the time referenced signals, such that the portable tag calculates its own position.

23 Claims, 8 Drawing Sheets

Positioning system

(51) Int. Cl.
*G01S 1/08* (2006.01)
*G01S 1/04* (2006.01)
*G01S 5/12* (2006.01)
*G01S 13/87* (2006.01)

(52) U.S. Cl.
CPC .............. *G01S 5/0268* (2013.01); *G01S 5/12* (2013.01); *G01S 5/14* (2013.01); *G01S 13/878* (2013.01)

(56) References Cited

OTHER PUBLICATIONS

Written Opinion of International Searching Authority for PCT/GB2017/000047 dated Jul. 21, 2017, 8 Pages.

Positioning system

Primary beacon architecture

Secondary beacon

Portable tag

Standard time-of-flight measurement

Compensated time-of-flight measurement

System pulses diagram

Position calculation

Position calculation by the intersection of parabolas

Parabola as a geometric place

Rotating system with 4 beacons

Rotating system, primary beacon A,
secondary beacons B and C

Rotating system, primary beacon B, secondary beacons A and D

Rotating system, primary beacon D, secondary beacons B and C

Rotating system, primary beacon B,
secondary beacons D and A

SYSTEM FOR ENHANCED INDOOR AND OUTDOOR POSITION MEASUREMENT

INTRODUCTION

The present invention relates to a method and apparatus for real time measurement of the position of one or more object and in particular to the measurement of the position and movement of individuals participating in an activity such as a team sport. In particular, the present invention provides an enhancement which improves the reliability and accuracy of position measurement systems and methods.

BACKGROUND TO THE INVENTION

There are many situations where the real time precise measurement of the position of objects or persons is needed, such as in team and individual sports, inventory location, construction sites, security, surveying, and many others. In team sports, for example, the position and movement of individual players in the context of the team and the opposing team can provide valuable information on player and team performance. Other data such as player speed, distance covered, acceleration and player position is also very valuable. Obtaining this data requires the creation of highly accurate and reliable systems for measuring player position and movement.

There are a number of known systems and methods for position measurement for example.

Global Positioning System (GPS) is a space-based navigation system that provides location and time information in all weather conditions, anywhere on or near the Earth where there is an unobstructed line of sight to four or more GPS satellites. However, such systems may not be used indoors.

An alternative to GPS which may be used indoors uses local beacons that have been precisely placed and need to have very high precision clocks to provide the required level of positional accuracy. In some cases, expensive time-of-flight based devices, using extremely precise timing circuits are used. However, these are hard to maintain and use.

There are also a number of mapping and surveying techniques for wireless signals such as Skyhook4, Wifarer 5, Google6. However, these are expensive, have limited precision, and need to be reconfigured whenever the local wireless routers network changes.

The Decawave7 system uses wireless sensors networks in ultra-wide-band radio frequency range. In this case, there is a need to maintain the network mesh at all times.

The process of calculating a current position by Dead Reckoning uses a previously determined position or fix and calculates the current position using information on speed and direction of travel such as would be provided using accelerometers and gyroscopes. These techniques lack precision.

Optical techniques such as the use of Light Emitting Diodes are also known. The Bytelight, system is a retail solution which works by locating shoppers and offering up timely info on the back of an awareness of their proximity to the beacon; such systems require a perfect line of sight for their successful operation.

SUMMARY OF THE INVENTION

The present invention provides a method and apparatus for measuring in real time and with high accuracy, the position of specially designed wearable receivers. The measurement applies both in large indoor areas and in limited area outdoor environments.

It is an object of the present invention to further improve the reliability and accuracy of position measurement systems and methods.

In accordance with a first aspect of the invention there is provided a system for measuring the position of one or more object in an area of interest, the system comprising:
one or more portable tag, the portable tag being attachable to the object;
Four or more beacons each positioned in separate fixed locations in or near the area of interest, wherein at least four of the beacons in the system are configured to have
a primary beacon function and a secondary beacon function such that the primary beacon function emits a primary signal, measures the time at which the primary signal is sent and measures the time at which an echo signal is received
the secondary beacon function generates an echo signal and measures the time at which the primary signal is received and echo signal sent
the portable tag measures the time referenced signal from the beacon using its primary beacon function and the time referenced echo from the beacons using their secondary beacon function to calculate the position of the portable tag with respect to the beacon using its primary beacon function and the beacons using their secondary beacon function
a controller which switches said beacons between their primary beacon function and their secondary beacon function to create a plurality of calculations of the position of the portable tag.

Preferably, the controller defines a cycle of measurement during which the function of the beacons is switched such that each position measurement made within the cycle of measurement contributes to the final position value for the portable tag.

Preferably, the position of the portable tag is calculated by averaging the n coordinates Advantageously, this increases the reliability of the tag position measurement.

In addition, if the line of sight of a beacon is obscured temporarily and/or partially, the present invention can provide an accurate position measurement using the remaining beacons. The line of sight may only be obscured between certain pairs of beacons which means switching beacon function as described in the present invention, increases the likelihood of obtaining good measurements when there is an obstruction.

Preferably, the beacon using its primary beacon function is adjacent to two beacons using their secondary beacon function.

Preferably, the beacon using its primary beacon function is adjacent to two beacons using their secondary beacon function, the beacons forming a right angle.

Alternatively, the beacon using its primary beacon function is not adjacent to at least one of the beacons using its secondary beacon function, Preferably, the system has four beacons arranged at the corners of a right angled parallelogram.

Optionally, the system has n beacons arranged at the corners of an n-sided shape.

Preferably, the sequence selects adjacent beacons to use their primary beacon function one after the other.

In effect, this rotates of the origin point of a coordinates system, defined by the primary beacon in every cycle of the measurement. In one embodiment, ten full cycles are performed per second, but any frequency that is possible to be processed by the computing power of the beacons is acceptable.

Alternatively, the system has one beacon which functions as the primary beacon and another which functions as a secondary beacon, the pulse/echo delays necessary for calculations are memorised then the second beacon functions as the primary beacon and a third functions as a secondary beacon and the corresponding pulse/echo delay necessary for calculations are memorised, the delay values are collected and used to make more than one calculation in order to compute alternative pairs of coordinates that will be used in the averaging the delay.

Advantageously, this measurement sequence simplifies the calculation and uses less bandwidth. The beacons create a single delay measurement for each pair, so only four round trips are necessary, creating a single delay measurement and a single parabola for each beacon pair. In using this arrangement more errors are likely to occur it provides a more stable result.

Advantageously, this arrangement and design of the beacons and portable tags is more stable.

Preferably, the primary beacon function comprises
a primary signal generator which generates a time referenced primary signal;
a primary transceiver for sending the primary signal to two or more secondary beacons and to one or more portable tag and for receiving an echo signal; and
a primary circuit for measuring the time at which the primary signal is sent and echo signal are received by the primary beacon.

Preferably, the secondary beacon function comprises:
a secondary signal generator which generates a time referenced echo signal in response to the receipt of the primary signal; and
a secondary transceiver for receiving the primary signal and transmitting the echo signal to one or more portable tag and to the primary beacon;
and a secondary circuit for measuring the time at which the primary signal is received and echo signal sent.

Preferably, the portable tag comprises a tag receiver for receiving and measuring the time referenced signal from the primary beacon, the time referenced echo from the secondary beacon and receiving time delay information comprising primary signal time delay information and echo signal delay information;
a portable tag circuit for calculating the distance of the portable tag to the primary and secondary beacons by means of a time of flight calculation which uses, the known position of the primary and secondary beacons, the time referenced signals and the delay information such that the portable tag calculates its own position.

Preferably, the signal is a radio frequency signal.

More preferably, the signal is an ultrawideband signal.

In accordance with a second aspect of the invention there is provided a method for measuring the position of one or more object in an area of interest, the method comprising the steps of:

Deploying four or more beacons each positioned in separate fixed locations in or near the area of interest, wherein at least four of the beacons in the system are configured to have a primary beacon function and a secondary beacon function Calculating the position of a portable tag which is attachable to an object with respect to the beacons by
emitting a time referenced pulse from a beacon with the primary beacon;
recording the time at which the pulse is received at the portable tag;
recording the time at which the pulse is received at two or more beacon with the secondary beacon function;
emitting a time referenced echo from the secondary beacons in response to the pulse;
recording the time at which the echo was sent;
recording the time at which the echo was received by the primary beacon, secondary beacon or portable tag;
and recording time delay information comprising primary signal time delay information and echo signal time delay information;
calculating the distance of the portable tag to the beacon having the primary function and the beacons having the secondary beacon function.

And switching said beacons between their primary beacon function and their secondary beacon function to create a plurality of calculations of the position of the portable tag.

Preferably, the step of switching said beacons defines a cycle of measurement during which each position measurement made within the cycle of measurement contributes to the final position value for the portable tag.

Preferably, the position of the portable tag is calculated by averaging n position measurements.

Advantageously, this increases the reliability of the tag position measurement.

In addition, if the line of sight of a beacon is obscured temporarily and/or partially, the present invention can provide an accurate position measurement using the remaining beacons. The line of sight may only be obscured between certain pairs of beacons which means switching beacon function as described in the present invention, increases the likelihood of obtaining good measurements when there is an obstruction.

Preferably, the beacon using its primary beacon function is adjacent to two beacons using their secondary beacon function.

Preferably, the beacon using its primary beacon function is adjacent to two beacons using their secondary beacon function, the beacons forming a right angle.

Alternatively, the beacon using its primary beacon function is not adjacent to at least one of the beacons using its secondary beacon function, Preferably, the system has four beacons arranged at the corners of a right angled parallelogram.

Optionally, the system has n beacons arranged at the corners of an n-sided shape.

Preferably, the sequence selects adjacent beacons to use their primary beacon function one after the other.

In effect, this rotates of the origin point of a coordinates system, defined by the primary beacon in every cycle of the measurement. In one embodiment, ten full cycles are performed per second, but any frequency that is possible to be processed by the computing power of the beacons is acceptable.

Alternatively, the system has one beacon which functions as the primary beacon and another which functions as a secondary beacon, the pulse/echo delays necessary for calculations are memorised then the second beacon functions as the primary beacon and a third functions as a secondary beacon and the corresponding pulse/echo delay necessary for calculations are memorised, the delay values are collected and used to make more than one calculation in order to compute alternative pairs of coordinates that will be used in the averaging the delay.

Advantageously, this measurement sequence simplifies the calculation and uses less bandwidth. The beacons create a single delay measurement for each pair, so only four round trips are necessary, creating a single delay measurement and a single parabola for each beacon pair. In using this arrangement more errors are likely to occur it provides a more stable result.

In accordance with a third aspect of the invention there is provided a beacon as defined in the first aspect of the invention.

BRIEF DESCRIPTION OF THE DRAWINGS

The present invention will now be described with reference to the accompanying drawings in which.

DETAILED DESCRIPTION OF THE DRAWINGS

FIGS. 1 to 10 show an example of a system which explains the functionality of a position measurement system to which the present invention may be applied. Application of the present invention to the system of FIGS. 1 to 10 requires all of the beacons to have the ability to function as both a primary beacon and a secondary beacon.

Figure 1:
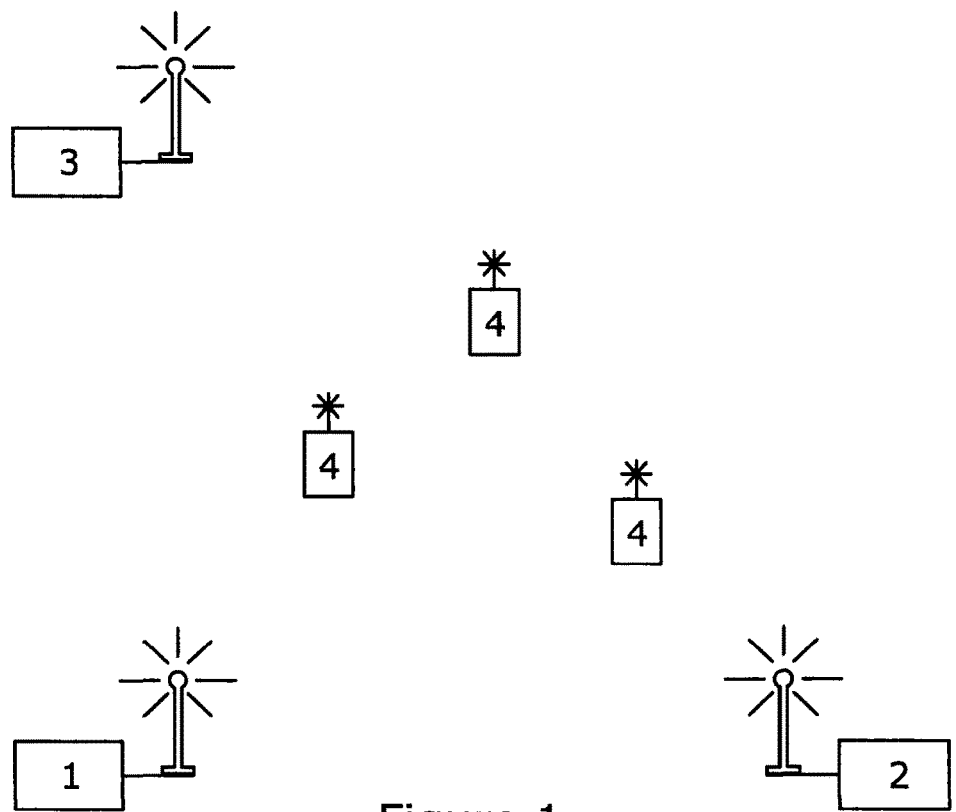
FIG. 1 is a schematic diagram of a position measurement system.
Figure 2:
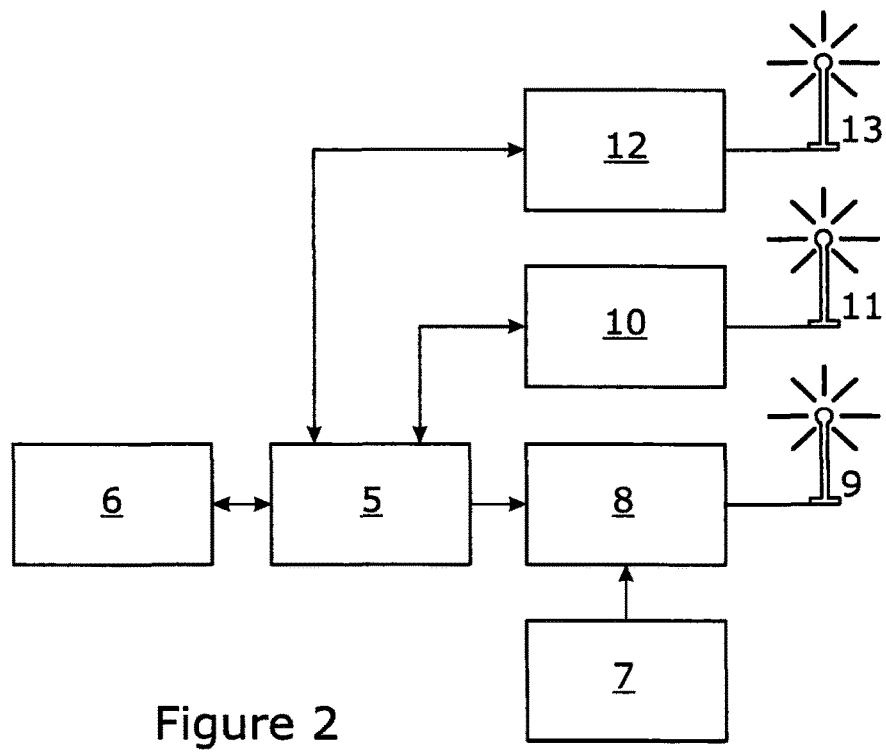
FIG. 2 is a schematic diagram which shows the architecture of an example of a primary beacon in a position measurement system.
Figure 3:
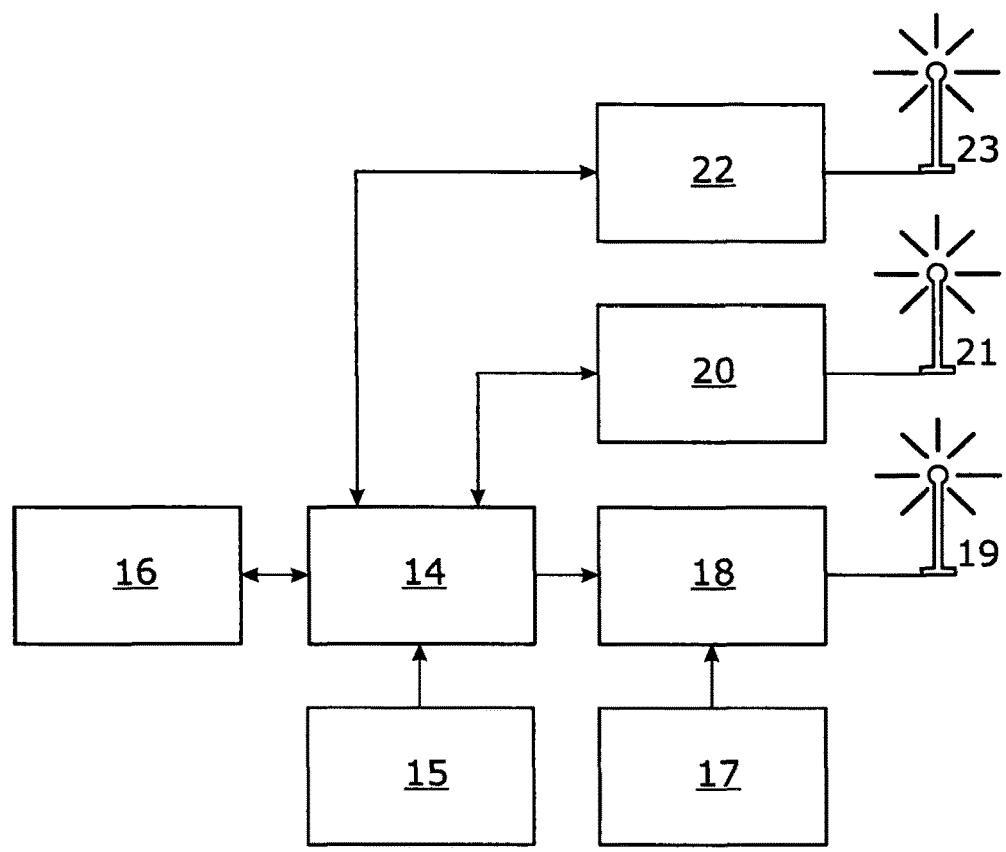
FIG. 3 is a schematic diagram which shows the architecture of an example of a secondary beacon in a position measurement system.
Figure 4:
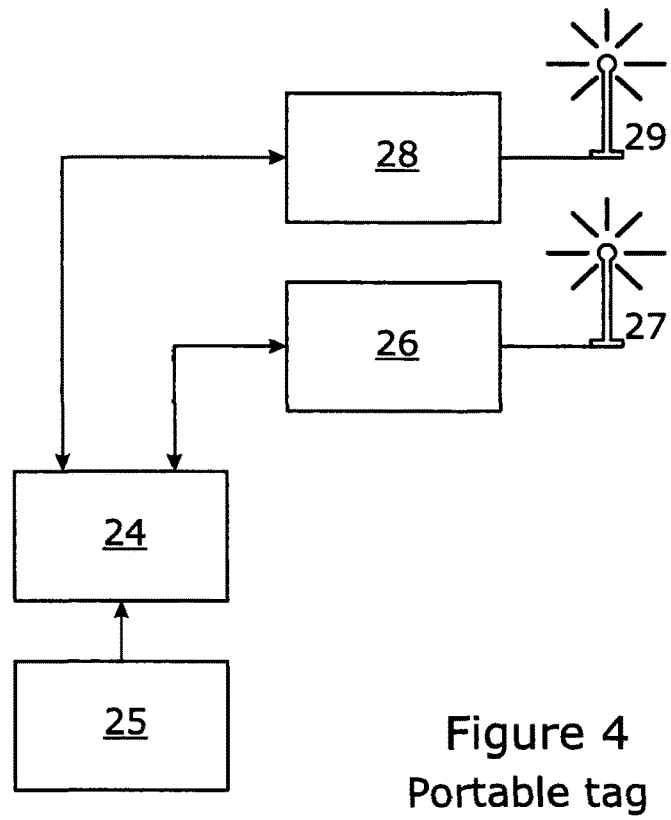
FIG. 4 is a schematic diagram which shows the architecture of an example of a portable tag in a position measurement system.
Figure 5:
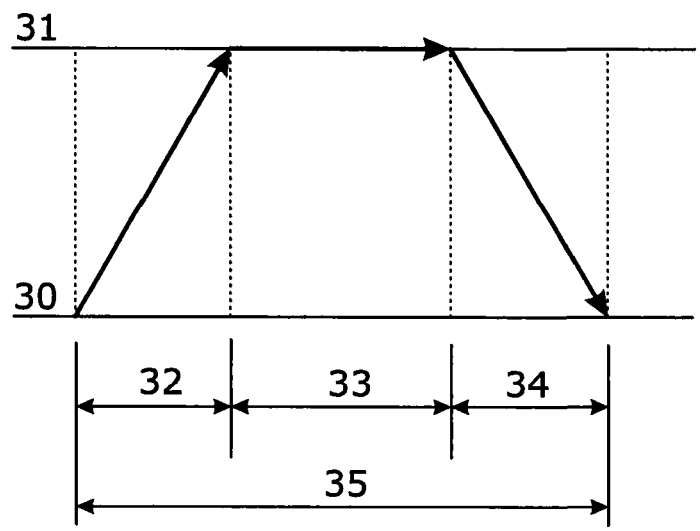
FIG. 5 is a diagram which shows a standard time of flight measurement.
Figure 6:
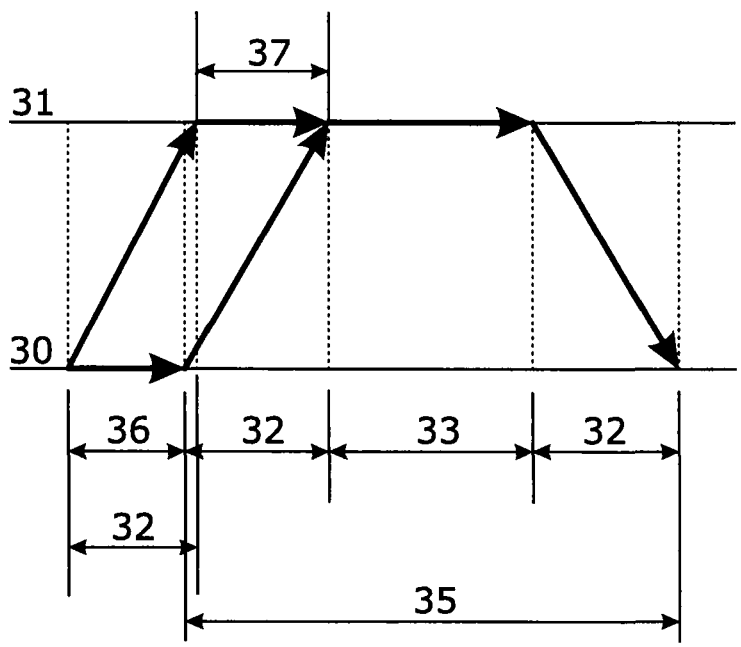
FIG. 6 is a diagram which shows a compensated time of flight measurement.
Figure 7:
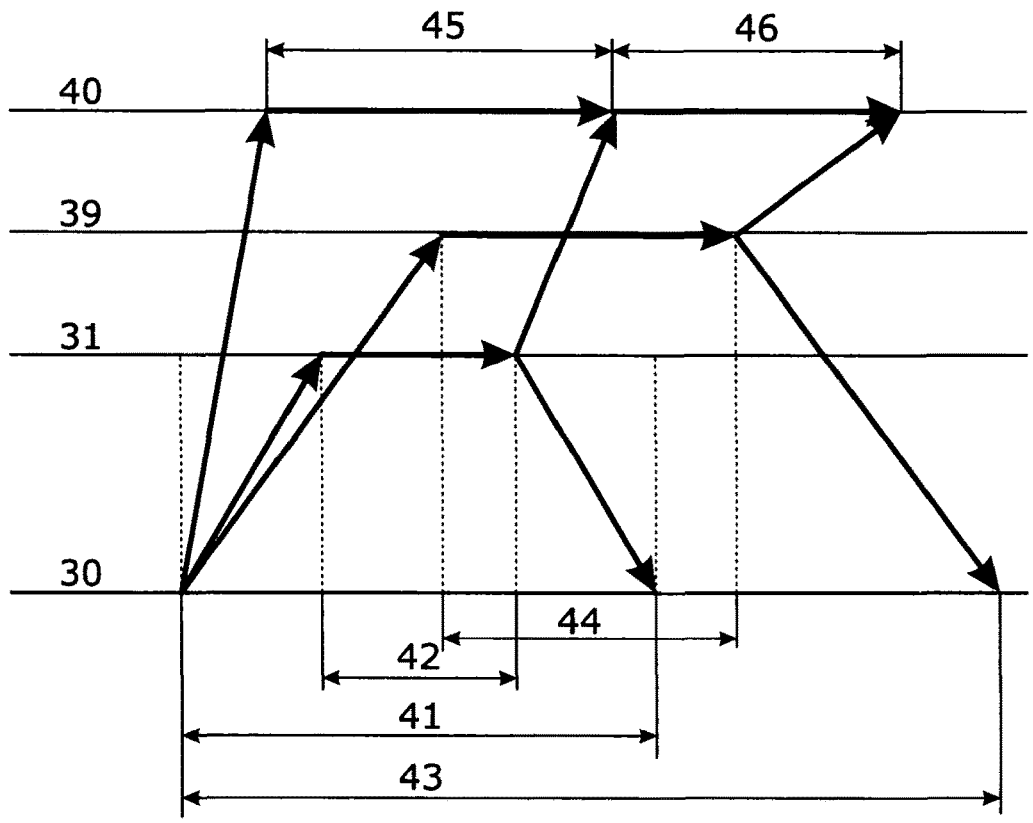
FIG. 7 is a system pulse diagram.

It will be noted that FIG. 1 focuses on the operation of beacons which operate as primary beacons and secondary beacons without a switch of functionality. FIGS. 2 to 4 provide more detailed information on the functionality of the beacons, FIGS. 5 to 7 show pulse diagrams for the system and FIGS. 8 to 10 an example of a method of position calculation.

The example of FIG. 1 is shown deployed for use on a sports pitch having area A, the area of interest. In this example, the system comprises a primary beacon 1 positioned near the side of area A, a secondary beacon 2 positioned on the same side of area A as the primary beacon 1 and a secondary beacon 3 positioned on the opposite side of area A from primary beacon 1 and secondary beacon 2. In this example, secondary beacons 2, 3 are spaced from primary beacon 1 in such way that straight lines connecting their position would form a right angled triangle. Other locations for the beacons may be used insofar as a direct line of sight is maintained between the beacons.

Portable tags or wearable receivers 4 are shown within the area of interest A. In this example, a portable tag has been attached to three separate players. During a game, the players may move around the area of interest A and the portable tags 4 receive signals transmitted from the primary beacon 1 and the secondary beacons 2, 3. In this and other embodiments, on the data channel, the portable tags are able to transmit, back to the primary beacon and/or secondary beacons, information comprising of own position, kinematics data, and/or any other physical measurements data.

In the context of a sports pitch where players may be in close contact in front of and around one another, and whilst the degree to which a line-of-sight is maintained may be sufficient to allow the system to operate successfully, switching beacon function as in the present invention provides a solution to this problem.

Distance and position measurement signals from the signal generator are sent over a dedicated radio channel or data channel integrated in the time rime referenced primary pulses and echo pulses.

Where a dedicated radio channel is used it may employ a standard protocol (802.15.4, ZigBee, WiFi radio modem) for data transmission. This may include positioning data feedback and other metrics relating to player movement and health such as player speed, acceleration, deceleration, temperature and heart rate.

In other embodiments of the invention more radio channels may be used and, the time-of-flight integrated data channel may use another radio channel and/or protocol.

FIG. 1 allows the calculation of the position of a number of objects in an area of interest where the object is fitted with a portable tag 4.

In order to calculate the position of each of the portable tags 4, the primary beacon 1 is positioned at a first fixed position at the side of the sports pitch A. As described in more detail with reference to FIG. 2, the primary beacon 1 has a signal generator, a transceiver for sending the signal to the secondary beacons 2, 3 and to the portable tags 4 and a data receiver.

The secondary beacons 2, 3 are located at separate fixed locations at the side of the pitch. As described in more detail with reference to FIG. 3, the secondary beacons each comprise a signal generator, a second transceiver for sending and receiving the signal to the portable tags 4 and to the primary beacon 1. The secondary beacons 2, 3 further comprise data transceivers which receive and transmits data relating to the operation of the secondary beacon. As described in more detail with reference to FIG. 4, the portable tags 4 comprise a transceiver operating for receiving and sending a signals from the primary beacon 1 and/or the secondary beacons 2, 3 and a data transceiver which receives and transmits data relating to the operation of the portable tag.

The primary beacon, is connected to a computer that processes data received from the other components of the system over the secondary channel, which is unrelated to tag position. The distance between one of the portable tags 4 and the primary and secondary beacons is calculated by measuring the time it takes for a signal round trip from the portable tag to primary and secondary beacons using a Time-of-Flight calculation. The data channel is used to transmit the internal delay 33 and which corrects the Time of Flight value and provides a more accurate calculation of the position of the portable tag. The secondary beacons can be connected to computer if data transmission needs to be enlarged.

FIG. 2 is a schematic diagram which shows the functionality of the primary beacon used in the example of FIG. 1.

FIG. 2 shows a microcontroller 5 which controls the functionality of the primary beacon and is connected to a host computer via the microcontroller interface 6. The first signal generator comprises a high frequency oscillator 7 which, oscillates continuously and which is switched by the fast switch 8 to produce time referenced trains of pulses which are transmitted to the secondary beacons and the portable tags through the antenna 9.

The time-of-flight receiver 10 records accurately the time when the pulses are sent from the primary beacon 1, and the time when the response time-of-flight pulses sent from the secondary beacons and/or the portable tags are received using antenna 11.

The timing errors of the fast switch 8 are corrected using the pulse time delay information in the time-of-flight receiver. The data, including positioning data from the secondary beacons, and from the wearable receivers in the field are communicated via data transceiver 12 and antenna 13.

FIG. 3 is a schematic diagram which shows the functionality of an example of a secondary beacon.

The microcontroller 14 controls the functionality of the secondary beacon. The microcontroller may communicate with a host computer via the microcontroller interface 16. Index reference 15 uniquely identifies the secondary beacon in the system so as to distinguish between individual secondary beacons. The system has a high frequency oscillator 17, oscillating continuously, which is switched by the fast switch 18 to send to the other components of the system time reference (trains of) pulses through the antenna 19. The time-of-flight receiver 20 records accurately the time when the pulses received from the primary beacon are received, and the time when the response time-of-flight pulses are sent using antenna 21.

The inherent timing errors of the fast switch 18 are masked by using the reference in the time-of-flight receiver. The data, including timing information for the pulses received and sent are communicated via data transceiver 22 and antenna 23.

In the present invention, each beacon comprises all of the components which allow it to function as a primary beacon and as a secondary beacon.

FIG. 4 is a schematic diagram which shows the functionality of an example of the wearable device or portable tag in accordance with the present invention. The microcontroller 24 uses the index reference 25 for uniquely identifying the device to the system. The time-of-flight receiver 26 records accurately the difference in time between the pulses received from the main and the secondary beacons. These pulses are received using antenna 27. The data, including information comprising of own position, kinematics data, and/or any other physical measurements data are communicated via data transceiver 28 and antenna 29.

In the above example, the core components of the system are consistent across the primary beacon, the secondary beacons and the portable tags and comprises a circuit that is able to precisely measure the interval between several events, and then report it back to the local microcontroller. This is the time-of-flight receiver, based on a time to digital converter {TDC). The converter is able to measure the delay between two or more pulses.

Time-of-flight may be measured as the time that the signal travels between a primary beacon to the secondary beacon, and then back.

In FIG. 5, the intersection between line 30 and the vectors represents the primary beacon events. The intersection between line 31 and the vectors represents the secondary beacon events.

The primary beacon transmits a pulse which is transmitted to the second beacon in the time interval 32, the secondary beacon sends back an echo with an un-avoidable time delay 33, which takes to transmit to the primary beacon the interval 34, equal with the interval 32 if the beacons are stationary. By measuring the round-trip time 35, and knowing the delay 33, the effective time of flight and the distance between the beacons can be computed.

In order to avoid measurement errors, the primary beacon measures the round trip (32)+(33)+(34)=(35) as the delay between the sending of the pulse, and the receiving of the echo, measured as well with the time-flight-receiver. The time-of-flight receiver has a Start input, triggered by the emerging pulse, and a Stop input triggered by the reception of the echo pulse. In this way the time-of-flight is accurately measured, without the intervention of the microcontroller, which is too slow to give accurate results for such fast processes.

The time delay 33 cannot be easily controlled, and with standard microcontroller techniques jitter of over 20 ns, or even 100 ns are expected. These delays can easily produce calculated errors between 3 and 15 m, or even bigger when other perturbing factors are considered. In order to compensate for this arbitrary delay, the time-of-flight receiver on the secondary beacon measures the effective delay between the emergent primary beacon to secondary beacon pulse reception, and the echoed pulse from the secondary beacon to the primary beacon. This measured delay is then transmitted over the data channel back to the primary beacon, which has now the means to calculate the effective time-of-flight of the pulse.

The calculated distance is:

$$D = (T(35) - T(33)) * c/2$$

where:
D is the distance between the beacons;
T(35) is the time measured for the round trip;
T(33) is the time transmitted back, via the data channel, to the primary beacon; c is the speed of light in air (for terrestrial measurements, 299,705,000 m/s).

In FIG. 6 is a diagram which shows a compensated time of flight measurement which relates to clock errors. Another perturbing factor is the fact that the frequency of the clocks of the time-of-flight receivers can differ or drift. This can be compensated by sending two pulses from the primary beacon, and comparing the delay between these pulses measured on the primary beacon and measured on the secondary beacon.

In FIG. 6, the intersection between line 30 and the vectors represents the primary beacon events. The intersection between line 31 and the vectors represents the secondary beacon events.

Considering that the distance between the beacons is the same as in the case of FIG. 5, the delay 32 is the same. In the ideal case, the delay 36 measured between the two pulses sent from the primary beacon, and the delay 37 measured between the reception of the two pulses on the secondary beacon shall be equal. However, the drift or difference in frequency between the two beacons can account for different values measured. In this case, sending back on the data channel the value of the time delay 37 can be used for correcting the time delay 33, this improving the precision of the time-of-flight measurement.

Applying the described techniques, the distance between the beacons can be accurately calculated as:

$$D=(T(35)-T(33)*T(36)/T(37))*c/2$$

where:
D is the distance between the beacons;
T(35) is the time measured for the round trip;
T(32) is the time transmitted back, via the data channel to the primary beacon;
T(36) and T(37) are the delays between the primary beacon reference pulses, measured by the primary beacon, and respectively measured by the secondary beacon;
c is the speed of light in air (for terrestrial measurements, 299,705,000 m/s).

The wearable receivers are receiving the pulses from all the beacons, measuring the delay between the main beacon pulse, and the secondary beacons pulses. The pulses diagram for the whole system is depicted in FIG. 7. For simplicity reasons, only the standard time-of-flight technique is depicted here, but corrections as for clock frequency errors may be included.

The intersection between line 30 and the vectors represents the primary beacon events. The intersection between line 31 and the vectors represents the first secondary beacon events. The intersection between line 39 and the vectors represents the second secondary primary events. The intersection between line 40 and the vectors represents one of the wearable devices events (the wearable device is not transmitting on the timing channel).

The interval 41 is the first secondary beacon round trip, while the interval 42 is the delay in the first secondary beacon. Using 41 and 42 the distance between the primary beacon and the first secondary beacon can be calculated, as shown above.

The interval 43 is the second secondary beacon round trip, while the interval 44 is the delay in the second secondary beacon. Using 43 and 44 the distance between the primary beacon and the second secondary beacon can be calculated, as shown above.

The interval 45 is the delay between the reception of the primary beacon pulse received by the wearable device, and the reception of the first secondary beacon pulse. The interval 46 is the delay between the reception of the first secondary beacon pulse received by the wearable device, and the reception of the second secondary beacon pulse. These intervals are used to calculate the position of the portable tag in relative to the beacons. Any number of portable tags can be included in the system and each can calculate its own position using the primary beacon pulses, secondary beacon echo and delay signals.

Figure 8:
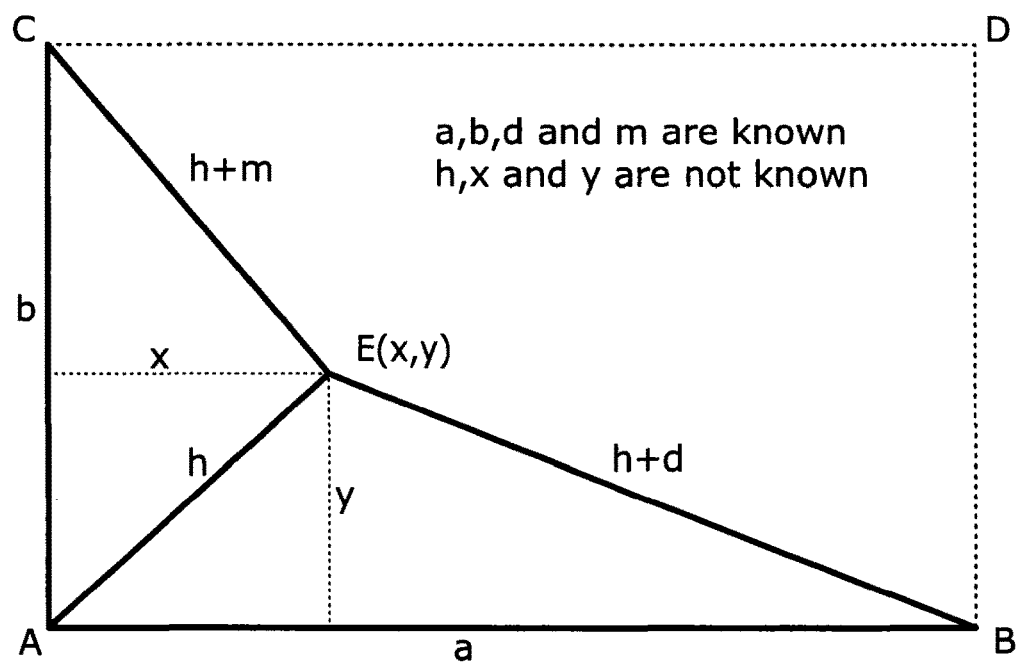
FIG. 8 is a diagram showing an object position calculation

Arranging the beacons in a perpendicular manner as shown in FIG. 8 allows for the calculation of the position of each of the wearable devices relative to the primary beacon from the positioning data transmitted to the tag. Using 4 beacons, the position of the wearable device can be calculated with arbitrary positioning of the beacons. FIG. 8 depicts a geometric representation that applies to the calculation of the position of the receiver.

In FIG. 8, A is the position of the primary beacon, considered to be the origin of the coordinates system, B and C are positions of the secondary beacons, and E is the position of the wearable receiver. The position of the wearable receiver (x,y) is the solution of the equations system shown below $$\sqrt{(x-a)^2+y^2}-\sqrt{x^2+y^2}=d$$

$$\sqrt{x^2+(y-b)^2}-\sqrt{x^2+y^2}=m|$$

The solution of the above equations system is the intersection of two parabolas in the pitch area, and it is calculated on each of the portable tags in the area.

Figure 9:
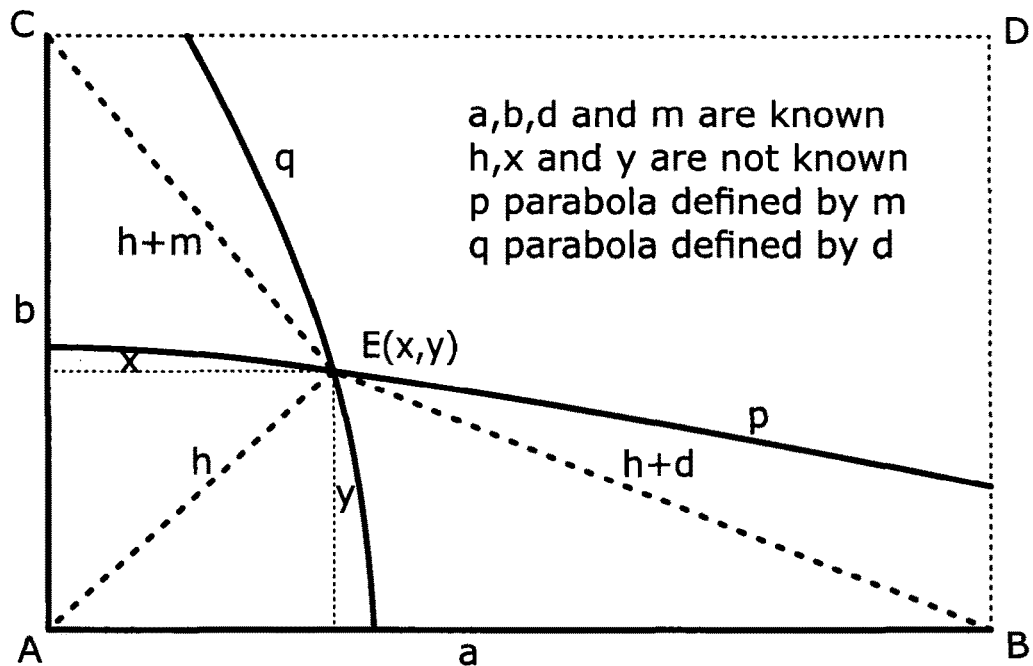
FIG. 9 illustrates the calculation of portable tag position using the intersection of parabolas.

FIG. 9 is the representation of the intersection of the two parabolas. Determining the position of the tags. The parabola "p" is determined by the delay "m", representing the geometric place of all the points that have the common distance difference between the primary beacon A and the secondary beacon C.

The parabola "q" is determined by the delay "d", representing the geometric place of all the points that have the common distance difference between the primary beacon A and the secondary beacon B. The common distance difference translates, in terms of time-of-flight, in constant delay between the two receiving signals.

Figure 10:
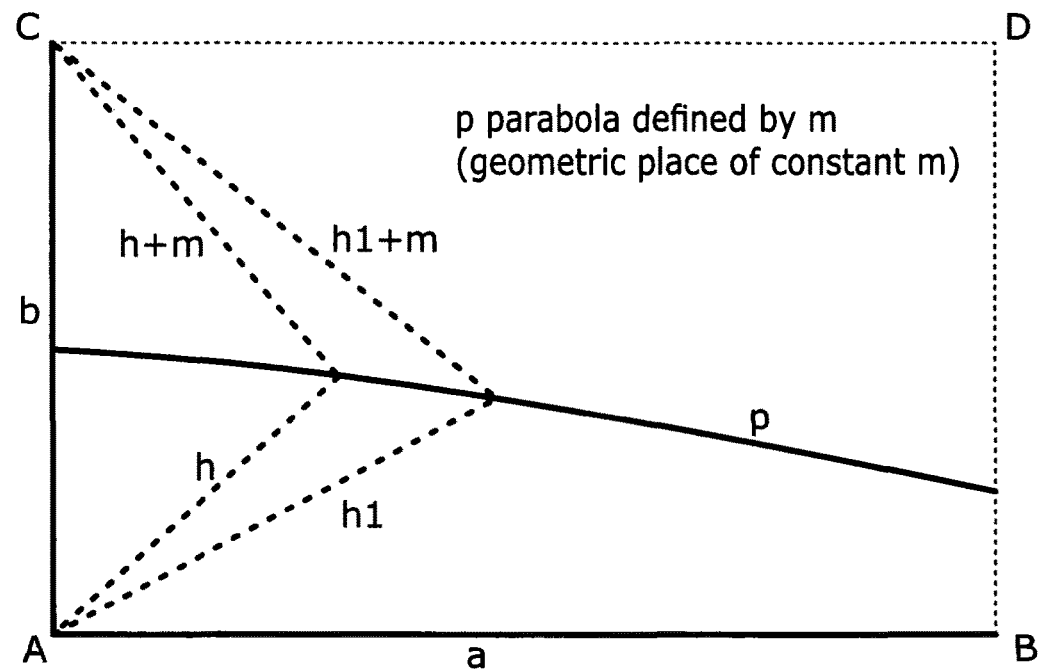
FIG. 10 illustrates the parabola determined by distance "m" (or the inferred delay) as a geometric place where "m" is constant.

FIG. 10 depicts the parabola determined by the common distance difference "m" (or the inferred delay) as a geometric place where "m" is constant.

A pre-calculated lookup table is created containing the delays in each of the divisions of the pitch (as example 10×10 cm for a pitch of 100×100 m) is recorded in each of the portable tags and used with a fast converging halving algorithm to efficiently determine the relative position of the portable tag compared to the position of the primary and secondary beacons. A scaling method was designed, so the pre-calculated table can be scaled independently on each of the axes corresponding to the distance measured between the primary and secondary beacons. More, a single lookup table is sufficient for both axes.

Figure 11:
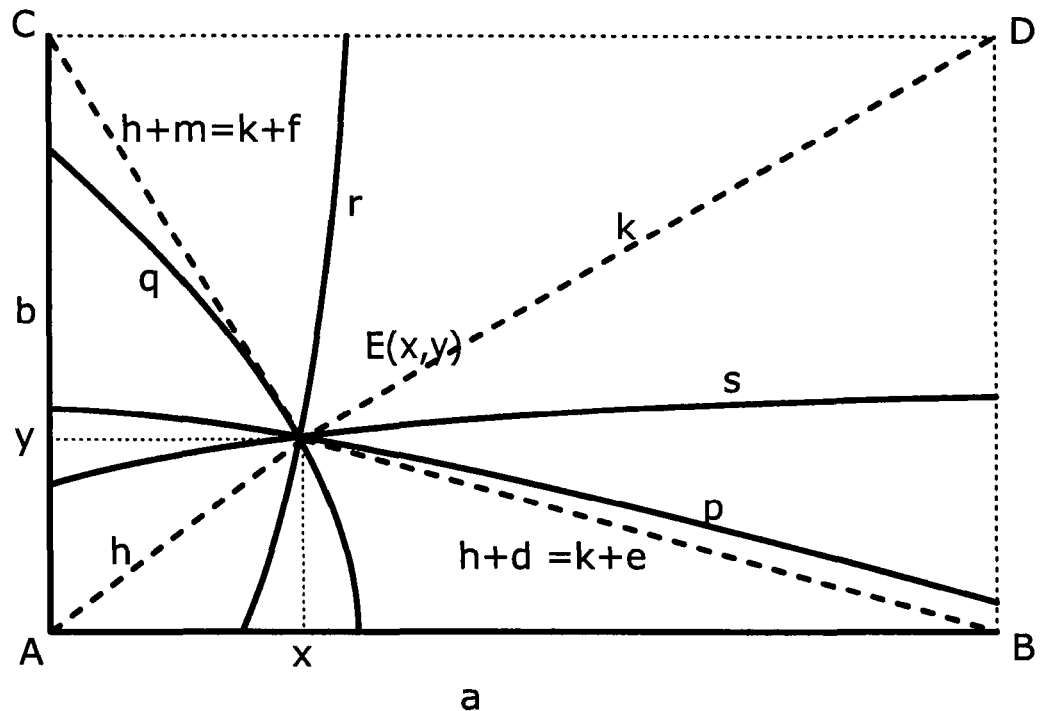
FIG. 11 is a schematic diagram which shows an example of a system in accordance with the present invention.

FIG. 11 shows an embodiment of the present invention which comprises a four beacons system that enhances the reliability and the precision of the system by allowing each beacon in the system to switch from having primary beacon functionality to secondary beacon functionality. FIG. 11 shows an area of interest which in this example is a sports pitch with beacons A, B, C and D positioned at the corners of the pitch.

In this example of the system in accordance with the present invention, the role of primary beacon is taken alternatively by each of the beacons from the corner of the pitch, secondary beacons being the beacons from the adjacent corners. The role of the primary beacon is rotated or switched in time between the beacons in the system. In this way, four groups of (x,y) coordinates can be calculated for the position of each portable tag. The position of the tag is calculated using an average of the coordinate values, so as to increase the reliability of the position measurement.

In addition, measuring the position of the tag from multiple primary beacon positions is useful where a temporary obstruction obscures the line of between one or more of the beacons and the portable tag. In this example of the present invention, tin effect, movement of the primary beacon function between beacons in the system rotates the coordinates system from which the portable tag's position is measured in every cycle of the measurement. In one embodiment, ten full cycles are performed per second, but any frequency is possible depending upon the processing power of the system components.

Figure 12:
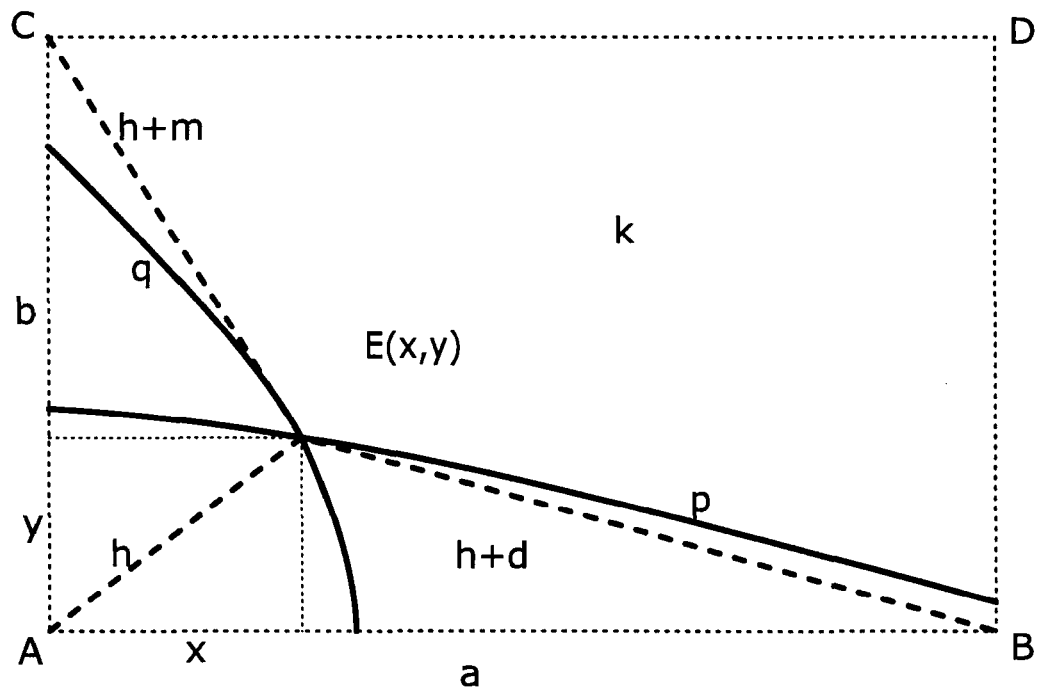
FIG. 12 is a schematic diagram which shows the embodiment of FIG. 11 with beacon A configured to function as the primary beacon and beacons B and C configured to act as the secondary beacons.

FIG. 12 depicts the configuration of the system when beacon A is primary, and beacons B and C are secondary. As example, this way the first set of coordinates x and y of the tag are computed.

Figure 13:
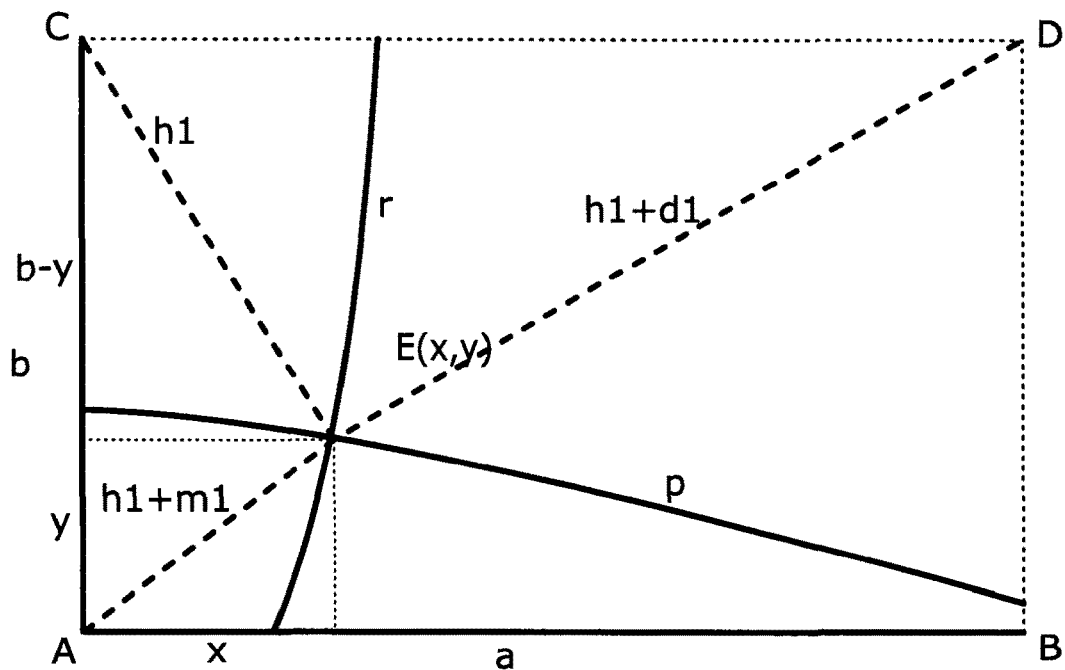
FIG. 13 is a schematic diagram which shows the embodiment of FIG. 11 with beacon C configured to function as the primary beacon and beacons D and A configured to act as the secondary beacons.

FIG. 13 depicts the configuration of the system when beacon C is primary, and beacons A and D are secondary. As the same example as in FIG. 12, this way coordinates x and b-y of the tag are computed, and the second set of coordinates x and y are computed.

Figure 14:
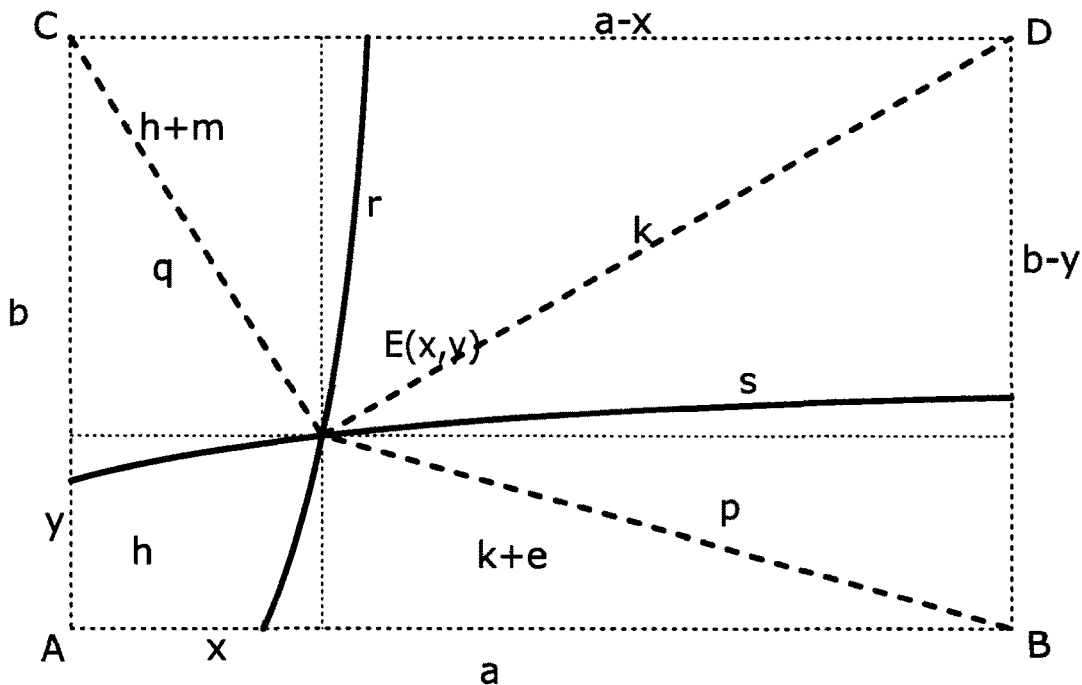
FIG. 14 is a schematic diagram which shows the embodiment of FIG. 11 with beacon D configured to function as the primary beacon and beacons B and C configured to act as the secondary beacons.

FIG. 14 depicts the configuration of the system when beacon D is primary, and beacons B and C are secondary. As the same example as in FIG. 12, this way coordinates a-x and b-y of the tag are computed, and the third set of coordinates x and y are computed.

Figure 15:
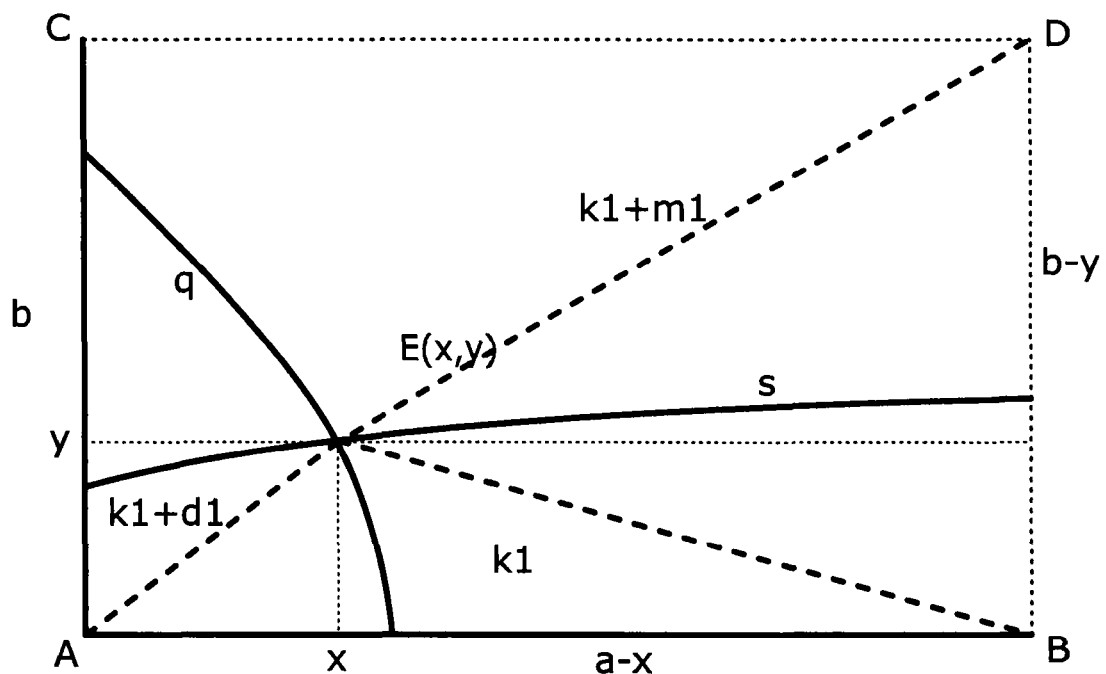
FIG. 15 is a schematic diagram which shows the embodiment of FIG. 11 with beacon B configured to function as the primary beacon and beacons D and A configured to act as the secondary beacons.

FIG. 15 depicts the configuration of the system when beacon B is primary, and beacons A and D are secondary. As the same example as in FIG. 12, this way coordinates a-x and y of the tag are computed, the fourth set of coordinates x and y are computed.

Averaging over the four sets of coordinates obtained this way increases the precision of the measurement.

This arrangement and design of the beacons and portable tags takes eight round trips of signal/echo to perform, having an increased reliability and precision. However, if the data channel is used over the same frequency, this procedure congests the transmission and computing time, and two redundant parabolas are created for each beacon pair.

In another embodiment of the present invention, a system may be adopted which uses a simplified measurement sequence which uses less bandwidth. In this case the system uses successively one beacon as primary, the next one as secondary, then it memorizes the delays necessary for calculations. Then the second beacon becomes primary, the third secondary, the corresponding delay is memorized again, and so on for all the beacons, including the pair formed by the last and the first (to close the cycle). After all the delays are collected, the data can be used to make more than one calculation in order to compute alternative pairs of coordinates that will be used in the averaging. In this example of the invention, the beacons create a single delay measurement for each beacon pair, so only four round trips are necessary, creating a single delay measurement and a single parabola for each beacon pair. This arrangement and design of the beacons and portable tags is less accurate than the eight round trips arrangement, but much more stable than the three beacons system descripted at the start of this patent application.

In the above embodiments of the present invention, the precise arrangement of the beacons in a rectangle makes the measuring process simpler and less prone to errors.

In other embodiments of the present invention, the principle of switching the functionality of the beacons may be extended to operate in areas of interest in which the beacons are positioned in a shape other than a right angled parallelogram and the number of beacons may be any number greater than four. For example, the beacons may define a pentagonal or hexagonal shape with five or six beacons respectively at the vertices. In another example, eight beacons may be used and positioned at the vertices of a hexagon.

In these examples of the present invention, the system can operate by calculating the position of the portable tag using adjacent beacons, which will be at 108° for the pentagonal shape and 120° for the hexagonal shape. Alternatively, four beacons which form a right angled parallelogram can be selected to calculate the portable tag position.

The method and the system apparatus described in this disclosure have the following characteristics:
easy to install, just several minutes for deployment of a new location;
on the fly calibration, a single precise beacon is necessary;
no surveying;
minimum three beacons, arbitrary placed, for a full deployment, more beacons for redundancy and increased precision, or larger area coverage possible;
can measure the location of an unlimited number of portable tags;
cheap to implement and deploy Improvements and modifications may be incorporated herein without deviating from the scope of the invention.

The invention claimed is:

1. A system for measuring the position of one or more object in an area of interest, the system comprising:
   one or more portable tag, the portable tag being attachable to the object;
   four or more beacons each positioned in separate fixed locations in or near the area of interest, wherein at least four of the beacons in the system are configured to have:
      a primary beacon function and a secondary beacon function such that the primary beacon function emits a primary signal, measures the time at which the primary signal is sent and measures the time at which an echo signal is received;
      the secondary beacon function generates an echo signal and measures the time at which the primary signal is received and echo signal sent;
   the portable tag measures the time referenced signal from the beacon using its primary beacon function and the time referenced echo from the beacons using their secondary beacon function to calculate the position of the portable tag with respect to the beacon using its primary beacon function and the beacons using their secondary beacon function; and
   a controller which switches said beacons between their primary beacon function and their secondary beacon function to create a plurality of calculations of the position of the portable tag.

2. A system as claimed in claim 1 wherein, the controller defines a cycle of measurement during which the function of the beacons is switched such that each position measurement made within the cycle of measurement contributes to the final position value for the portable tag.

3. A system as claimed in claim 1 wherein, the position of the portable tag is calculated by averaging n coordinates.

4. A system as claimed in claim 1 wherein, the beacon using its primary beacon function is adjacent to two beacons using their secondary beacon function.

5. A system as claimed in claim 4 wherein, the beacon using its primary beacon function is adjacent to two beacons using their secondary beacon function, the beacons forming a right angle.

6. A system as claimed in claim 1 wherein, the beacon using its primary beacon function is not adjacent to at least one of the beacons using its secondary beacon function.

7. A system as claimed in claim 1 wherein, the system has four beacons arranged at the corners of a right angled parallelogram.

8. A system as claimed in claim 1 wherein, the system has n beacons arranged at the corners of an n-sided shape.

9. A system as claimed in claim 1 wherein, the sequence selects beacons to use their primary beacon function one after the other.

10. A system as claimed in claim 1 wherein, the system has a first beacon which functions as the primary beacon and a second beacon which functions as a secondary beacon, a pulse/echo delays necessary for calculations are memorised then the second beacon functions as the primary beacon and a third beacon functions as the secondary beacon and a corresponding pulse/echo delay necessary for calculations are memorised, the delay values are collected and used to make more than one calculation in order to compute alternative pairs of coordinates that will be used in the averaging the delay.

11. A system as claimed in claim 1 wherein, the primary beacon function comprises:
a primary signal generator which generates a time referenced primary signal;
a primary transceiver for sending the primary signal to two or more secondary beacons and to one or more portable tag and for receiving an echo signal; and
a primary circuit for measuring the time at which the primary signal is sent and echo signal are received by the primary beacon.

12. A system as claimed in claim 1 wherein, the secondary beacon function comprises:
a secondary signal generator which generates a time referenced echo signal in response to the receipt of the primary signal;
a secondary transceiver for receiving the primary signal and transmitting the echo signal to one or more portable tag and to the primary beacon; and
a secondary circuit for measuring the time at which the primary signal is received and echo signal sent.

13. A system as claimed in claim 1 wherein, the portable tag comprises a tag receiver for receiving and measuring the time referenced signal from the primary beacon, the time referenced echo from the secondary beacon and receiving time delay information comprising primary signal time delay information and echo signal delay information;
a portable tag circuit for calculating the distance of the portable tag to the primary and secondary beacons by means of a time of flight calculation which uses, the known position of the primary and secondary beacons, the time referenced signals and the delay information such that the portable tag calculates its own position.

14. A method for measuring the position of one or more object in an area of interest, the method comprising the steps of:
deploying four or more beacons each positioned in separate fixed locations in or near the area of interest, wherein at least four of the beacons in the system are configured to have a primary beacon function and a secondary beacon function
calculating the position of a portable tag which is attachable to an object with respect to the beacons by:
emitting a time referenced pulse from a beacon with the primary beacon;
recording the time at which the pulse is received at the portable tag;
recording the time at which the pulse is received at two or more beacon with the secondary beacon function;
emitting a time referenced echo from the secondary beacons in response to the pulse;
recording the time at which the echo was sent;
recording the time at which the echo was received by the primary beacon, secondary beacon or portable tag; and
recording time delay information comprising primary signal time delay information and echo signal time delay information;
calculating the distance of the portable tag to the beacon having the primary function and the beacons having the secondary beacon function; and
switching said beacons between their primary beacon function and their secondary beacon function to create a plurality of calculations of the position of the portable tag.

15. A method as claimed in claim 14 wherein, the step of switching said beacons defines a cycle of measurement during which each position measurement made within the cycle of measurement contributes to the final position value for the portable tag.

16. A method as claimed in claim 14 wherein, the position of the portable tag is calculated by averaging n position measurements.

17. A method as claimed in claims 14 wherein, the beacon using its primary beacon function is adjacent to two beacons using their secondary beacon function.

18. A method as claimed in claims 14, the beacon using its primary beacon function is adjacent to two beacons using their secondary beacon function, the beacons forming a right angle.

19. A method as claimed in claims 14 wherein, the beacon using its primary beacon function is not adjacent to at least one of the beacons using its secondary beacon function.

20. A method as claimed in claims 14 wherein, the system has four beacons arranged at the corners of a right angled parallelogram.

21. A method as claimed in claims 14 wherein, the system has n beacons arranged at the corners of an n-sided shape.

22. A method as claimed in claims 14 wherein, the sequence selects adjacent beacons to use their primary beacon function one after the other.

23. A method as claimed in claim 14 wherein, the portable tag comprises a tag receiver for receiving and measuring the time referenced signal from the primary beacon, the time referenced echo from the secondary beacon and receiving time delay information comprising primary signal time delay information and echo signal delay information;
a portable tag circuit for calculating the distance of the portable tag to the primary and secondary beacons by means of a time of flight calculation which uses, the known position of the primary and secondary beacons, the time referenced signals and the delay information such that the portable tag calculates its own position.

* * * * *